Dec. 15, 1931.　　　　　S. BEPPU　　　　　1,836,150
TURN INDICATOR FOR MOTOR VEHICLES
Filed Aug. 8, 1930　　2 Sheets-Sheet 1
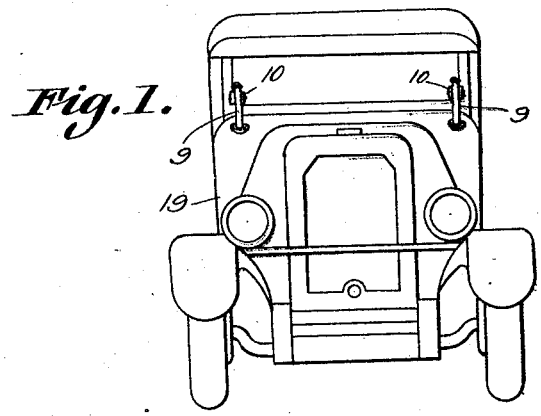
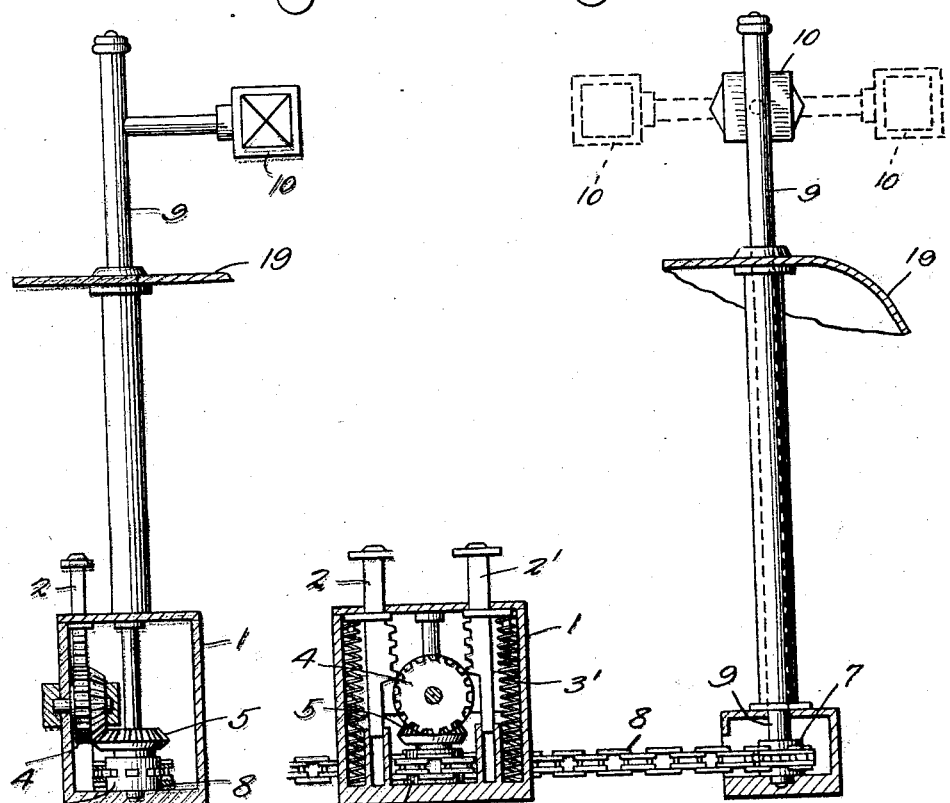
Inventor
Shichiro Beppu
By B. Singer
Attorney

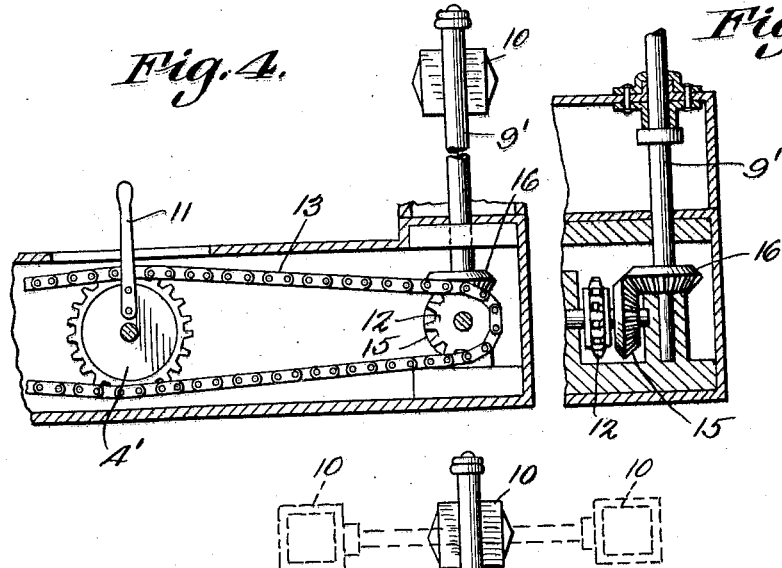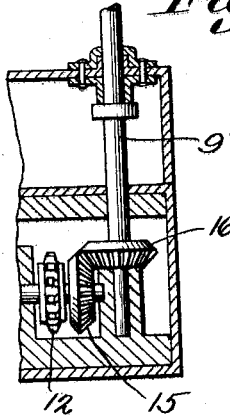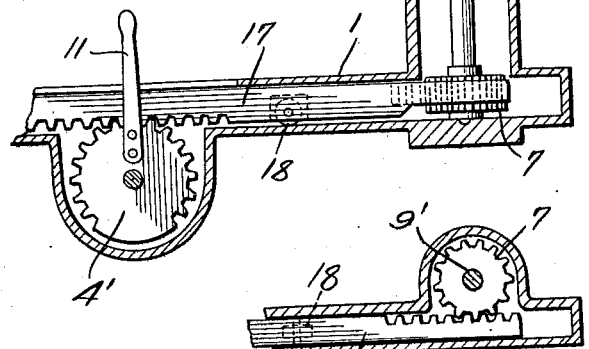

Patented Dec. 15, 1931

1,836,150

UNITED STATES PATENT OFFICE

SHICHIRO BEPPU, OF TOKYO, JAPAN

TURN INDICATOR FOR MOTOR VEHICLES

Application filed August 8, 1930. Serial No. 473,972.

My invention relates to a turn indicator for a motor vehicle, and comprises a vertical indicator stem or stems rotatably mounted in the front part of the vehicle, having at its upper end a horizontal arm carrying an indicator lamp normally indicating the direction parallel to the longitudinal axis of the vehicle, and a hand lever or pedal operatively connected to said indicator stem or stems for rotating the latter in either direction through an angle of 90°, so that the indicator lamp is turned to the right or left to indicate the desired direction in which the driver intends to turn the vehicle.

The object of my invention is to devise a novel turn indicator for a motor vehicle which is simple in construction and can be readily operated.

In the drawings, illustrating what I now consider the preferred forms of my invention:

Fig. 1 is a front view of a motor vehicle equipped with a device according to my invention.

Fig. 2 is a sectional view showing one form of embodiment of my invention, in which the indicator is actuated by pressing down one of two rack bars, each provided with a pedal at its top.

Fig. 3 is a section through the gear case shown in Fig. 2, section being taken at right angle to Fig. 2.

Fig. 4 shows in section a modified form of mechanism for operating the indicator stem.

Fig. 5 is a section taken at right angle to Fig. 4.

Fig. 6 shows in section another modification of the mechanism for operating the indicator stems.

Fig. 7 is a detail plan view of a rack and pinion shown in Fig. 6.

In carrying out my invention, I provide a rotatable vertical stem preferably on both sides at the front of the vehicle. Each stem projects upwardly and at its upper end it is provided with an arm carrying an indicator consisting of a lamp. Said indicator stems are provided at lower ends with gears and are connected by means of a driving chain or a toothed rack to a toothed wheel, and the latter is adapted to be partially rotated in either direction by means of a pedal or hand lever. The arrangement is such that by actuating said hand lever or pedal, each indicator stem is rotated through an angle of 90° in either direction, so that the lamp on the arm fixed on the stem may be turned to indicate right-turn or left-turn according to the driver's will.

Both lamps are normally held in the neutral position and indicate the direction parallel to the longitudinal axis of the vehicle.

Referring to Figs. 2 and 3, in the case 1 are mounted two toothed racks 2, 2' facing to each other, which racks being normally pressed upwardly by springs 3, 3'. Engaged and embraced by said toothed racks 2, 2' is a toothed wheel 4 rotatably mounted on one of the walls of the case 1. The toothed wheel 4 has integral therewith a bevel gear which engages with another bevel gear 5 secured to a sprocket wheel 6. On the lower end of each indicator stem 9 is fixed a sprocket wheel 7 which is connected by means of an endless driving chain 8, the latter being passed around the sprocket wheel 7, the sprocket wheel 6 and other sprocket wheel 7 (not shown), so that upon rotation of the toothed wheel 4 in either direction both indicator stems 9 are rotated in the corresponding direction. Each indicator stem 9 has a transverse arm carrying an indicator lamp 10 adapted to be ignited at night.

From the foregoing it will be seen that upon depression of either one of the toothed racks 2, 2' the toothed wheel 4 is rotated in the corresponding direction, and consequently that the arms with the indicator lamps 10 are turned to the right or left through an angle of 90°, whereby indicating the direction in which the driver just intends to turn the vehicle.

In the embodiment shown in Figs. 4 and 5, the toothed wheel 4' is adapted to be rotated in either direction by means of a hand lever 11 which is directly fixed to the wheel 4'. The latter is constructed as a sprocket wheel and is connected to other sprocket wheels 12 (only one thereof being shown) by means of an endless driving chain 13. Fixed on the same axis of the sprocket wheel 12 is a bevel gear 15 which cooperates with a bevel gear 16 fixed on the lower end of the indicator stem 9'. In this construction, the indicator lamps 10 are turned to the right or left by pushing forward or pulling backward the hand lever 11, which movement being transmitted through the sprocket wheels 4', the chain 13, the sprocket wheel 12, bevel gears 15 and 16 to the indicator stem 9' carrying the lamp 10.

In the further modified form of embodiment shown in Figs. 6 and 7, the driving chain 13 in the above mentioned embodiment has been replaced by a toothed rack 17. In this case, there is preferably provided an antifriction roller 18 supporting the rack bar 17 and running on the rail formed by the base plate of the gear case 1.

Whilst in the drawings only one indicator stem 9 is shown as connected to the actuating means, it is preferred that in practice two similar indicator stems 9, each carrying the lamp 10, are arranged on both sides in the front part of the motor vehicle 19 as shown in Fig. 1.

As herebefore described, according to my invention, the driver may easily turn the indicator lamps 10 into a desired direction by manipulating the hand lever or one of the toothed racks having pedals, and when the indicator lamps have finished their service each indicator lamp is returned to its normal position indicating the direction parallel to the longitudinal axis of the vehicle by returning the hand lever or the pedal to its neutral or initial position.

What I claim is:—

A motor vehicle traffic signal comprising a revoluble indicator stem having an indicator stem having an indicator device, a toothed wheel mounted for rotation, a pair of manually operable racks arranged on opposite sides of said toothed wheel and having means to guide them vertically, springs to normally hold said racks in elevated position, disengaged from said toothed wheel, and power transmission means connecting said toothed wheel and said signalling stem.

In testimony whereof I affix my signature.

his
SHICHIRO × BEPPU.
mark